(12) United States Patent
Li et al.

(10) Patent No.: US 10,415,232 B2
(45) Date of Patent: Sep. 17, 2019

(54) MARITIME GREEN HUMAN SETTLEMENT SYSTEM AND MODULARIZED CONSTRUCTION METHOD THEREFOR

(71) Applicant: CHINA CONSTRUCTION STEEL STRUCTURE CORP. LTD., Shenzhen, Guangdong (CN)

(72) Inventors: Renge Li, Shenzhen (CN); Xuanmao Liao, Shenzhen (CN); Biao Liao, Shenzhen (CN); Lixian Dai, Shenzhen (CN); Shaoyuan Peng, Shenzhen (CN); Dingguo Yang, Shenzhen (CN); Ying Wei, Shenzhen (CN)

(73) Assignee: CHINA CONSTRUCTION STEEL STRUCTURE CORP. LTD., Shenzhen, Guangdong (CN)

( * ) Notice: Subject to any disclaimer, the term of this patent is extended or adjusted under 35 U.S.C. 154(b) by 0 days.

(21) Appl. No.: 15/768,814

(22) PCT Filed: Jul. 18, 2016

(86) PCT No.: PCT/CN2016/090333
§ 371 (c)(1),
(2) Date: Apr. 16, 2018

(87) PCT Pub. No.: WO2017/063416
PCT Pub. Date: Apr. 20, 2017

(65) Prior Publication Data
US 2018/0313076 A1    Nov. 1, 2018

(30) Foreign Application Priority Data

Oct. 14, 2015   (CN) .......................... 2015 1 0663108

(51) Int. Cl.
*E04B 1/348* (2006.01)
*E04G 21/14* (2006.01)
(Continued)

(52) U.S. Cl.
CPC .......... *E04B 1/34815* (2013.01); *C02F 1/001* (2013.01); *C02F 3/327* (2013.01);
(Continued)

(58) Field of Classification Search
CPC .... E04B 1/34815; E04B 1/343; E04B 1/3483; E04B 2001/34884; E04B 1/34861;
(Continued)

(56) References Cited

U.S. PATENT DOCUMENTS 4,255,912 A * 3/1981 Kovacs ............... E04B 1/34331
                                                                 52/222
4,261,329 A * 4/1981 Walsh ...................... B60P 3/00
                                                                 126/569
(Continued)

FOREIGN PATENT DOCUMENTS

CN    102747844 A    10/2012
CN    202842118 U     4/2013
(Continued)

OTHER PUBLICATIONS

ISA/CN, "International Search Report," International Application No. PCT/CN2016/090333, dated Sep. 26, 2016, 9 pages.

*Primary Examiner* — Beth A Stephan
(74) *Attorney, Agent, or Firm* — Whiteford, Taylor & Preston, LLP; Peter J. Davis

(57) ABSTRACT

A maritime green human settlement system and a modularized construction method therefor. The maritime green human settlement system comprises at least one floor unit (1), solar photovoltaic plates (2), and a deck (3). The floor unit (1) is mounted on the deck (3). The solar photovoltaic plates (2) are mounted on the top surface of the highest floor unit (1). Each floor unit (1) comprises at least one room and indoor furniture. The room and the indoor furniture are formed by means of dislocated splicing of at least three
(Continued)

modules (4), and at least one recessed portion (H) is formed at splicing positions. The maritime green human settlement system can form multiple indoor-outdoor spatial relationships; the flexibility is high, the construction period is short, and costs are low.

13 Claims, 3 Drawing Sheets

(51) Int. Cl.

| | | |
|---|---|---|
| E04H 1/04 | (2006.01) | |
| H02S 20/22 | (2014.01) | |
| C02F 1/00 | (2006.01) | |
| C02F 3/32 | (2006.01) | |
| E02B 17/00 | (2006.01) | |
| E04H 1/00 | (2006.01) | |
| C02F 103/00 | (2006.01) | |
| C02F 103/08 | (2006.01) | |

(52) U.S. Cl.
CPC .............. *E02B 17/00* (2013.01); *E04G 21/14* (2013.01); *E04H 1/005* (2013.01); *E04H 1/04* (2013.01); *H02S 20/22* (2014.12); *C02F 2001/007* (2013.01); *C02F 2103/001* (2013.01); *C02F 2103/08* (2013.01); *C02F 2303/04* (2013.01); *E02B 2017/0039* (2013.01); *Y02B 10/12* (2013.01)

(58) Field of Classification Search
CPC ......... E04B 1/37892; E02B 2017/0039; E02B 17/00; C02F 1/001; E04H 1/005; E04H 2001/1283
USPC ....................... 114/65 R; 52/70.1, 79.2, 79.3
See application file for complete search history.

(56) References Cited

U.S. PATENT DOCUMENTS

| | | | | |
|---|---|---|---|---|
| 5,474,672 A | * | 12/1995 | Peterson | ................ B01D 17/08 210/103 |
| 5,918,276 A | * | 6/1999 | Grindle | ..................... E06B 9/68 73/170.11 |
| 6,120,686 A | * | 9/2000 | Bilz | ........................ B01J 47/024 210/248 |
| 6,688,048 B2 | * | 2/2004 | Staschik | .................... C02F 9/00 52/220.1 |
| 6,698,147 B2 | * | 3/2004 | Bergman | ............ E04B 1/34823 52/234 |
| 7,326,355 B2 | * | 2/2008 | Graetz | .................. B01D 61/18 141/10 |
| 8,800,215 B2 | * | 8/2014 | Yoder | ..................... G21F 1/125 52/79.1 |
| 9,828,273 B2 | * | 11/2017 | Barlow | ................ B01D 61/145 |
| 2013/0239487 A1 | * | 9/2013 | Ingjaldsdottir | ......... E04C 2/384 52/79.1 |
| 2014/0115976 A1 | * | 5/2014 | Lippert | ................... E04H 1/005 52/79.2 |
| 2015/0240475 A1 | * | 8/2015 | Malakauskas | ...... E04B 1/34838 52/79.13 |
| 2016/0130795 A1 | * | 5/2016 | Downey | ................... E04H 5/00 52/79.1 |
| 2016/0237705 A1 | * | 8/2016 | Wee | ........................ B63B 17/02 |
| 2017/0145706 A1 | * | 5/2017 | Wee | ........................ E04H 1/005 |

FOREIGN PATENT DOCUMENTS

| | | |
|---|---|---|
| CN | 103982038 A | 8/2014 |
| CN | 105298158 A | 2/2016 |
| CN | 205153587 U | 4/2016 |
| DE | 3226742 A1 | 1/1984 |
| WO | 0001898 A1 | 1/2000 |

\* cited by examiner

MARITIME GREEN HUMAN SETTLEMENT SYSTEM AND MODULARIZED CONSTRUCTION METHOD THEREFOR

CROSS-REFERENCE TO RELATED APPLICATIONS AND CLAIM OF PRIORITY

This application is a 371 National Stage of International Application No. PCT/CN2016/090333 filed Jul. 18, 2016, which claims priority to Chinese Patent Application No. 201510663108.3 filed Oct. 14, 2015, the disclosures of which are herein incorporated by reference in their entirety.

TECHNICAL FIELD

The present disclosure relates to the technical field of building construction, and particularly to a maritime green human settlement system and a modularized construction method thereof.

BACKGROUND ART

With the improvement of science and technology, maritime resources are more and more widely used, and the concept of maritime human settlement also becomes increasingly popular among people. As to the harsh and changeable marine environment, the safety, comfort and maximization of resource utilization are generally needed to be fully considered during the construction of an offshore house. However, an offshore house has lots of components, and the electromechanical system and the photovoltaic system thereof are relatively complicated with respect to a house on the land, thereby leading to lots of onsite component manufacturing, processing and assembly during the construction process, which not only significantly wastes the building construction time and prolongs the construction period, but also results in that the constructed offshore houses tend to be uniform in style with fixed layout and poor flexibility.

SUMMARY OF THE DISCLOSURE

The technical problem to be solved by the present disclosure is to provide a maritime green human settlement system and a modularized construction method thereof, through which multiple indoor and outdoor spatial relationships can be provided with high flexibility, short construction period and low cost.

The present disclosure is implemented as follows: a maritime green human settlement system includes at least one storey unit, solar photovoltaic plates, and a deck. The at least one storey unit is mounted on the deck, the solar photovoltaic plates are mounted on a top surface of a highest one of the storey units, each storey unit includes at least one room and indoor furniture, the at least one room and the indoor furniture are formed by splicing at least three modules in a dislocation manner, and at least one recessed portion is formed at splicing positions.

Furthermore, one recessed portions is designed to be an entryway.

Furthermore, the recessed portion is in number of at least two, and one of the recessed portions is designed to be a gazebo for sea view.

Furthermore, the rooms is in number of at least three, and each room includes a kitchen, a bathroom and an equipment room, with the kitchen, the bathroom and the equipment room respectively located in different modules.

Furthermore, the bathroom is adjacent to the equipment room.

Furthermore, each storey unit is provided with a viewing side for sea view and a non-viewing side, and the bathroom, the equipment room and the kitchen are located at the non-viewing side of the storey unit.

Furthermore, each of the modules includes a frame, outer walls, inner partition walls, a suspended ceiling and a floor. The outer walls are made by a heat insulation technology, and the inner partition walls and the suspended ceiling are made by a light-gauge steel joist system.

Furthermore, the maritime green human settlement system also includes a rainwater collecting system for recycling rainwater. The rainwater collecting system includes a rainwater filtering device, a water storage device and a purification device.

Furthermore, the maritime green human settlement system also includes a reclaimed water treatment system for recycling domestic wastewater. The reclaimed water treatment system includes a grating, a regulating tank, a sedimentation tank, a lifting pump, a hair filter and sterilizing equipment.

Furthermore, the maritime green human settlement system includes a plurality of storey units and stairs. The stairs are mounted between two adjacent storey units.

Embodiments of the present disclosure further provide a modularized construction method for constructing the maritime green human settlement system. The method includes steps of:

A. determining, according to requirements of a customer, the number of floors, the number of modules in each storey unit and the optimal mode of combining the modules, and manufacturing individual components of each module and performing preassembling and internal decoration for the modules separately, in a factory prefabricating stage;

B. transporting, the individual modules to a construction site, and hoisting individual modules of a first storey unit to a designated position, before construction operation is started;

C. assembling the deck, and splicing the individual modules of the first storey unit in a dislocation manner on the deck to form an irregular integral structure, during the construction operation; and D. mounting solar photovoltaic plates on a top surface of a highest storey unit.

Furthermore, in step C, the modules are connected through bolts, and a gypsum board and sealant are used to seal off splicing gaps, after the splicing of modules is done.

Furthermore, the method further includes a step between step C and step D:

Mounting, in a similar manner to step C, a second storey unit on a top surface of the first storey unit, and repeating the mounting until the remaining storey units are all mounted; and mounting a stair between two adjacent storey units.

Furthermore, the modularized construction method also includes step E of:

performing a dehumidification operation on the maritime human settlement system.

Compared with the prior art, the present disclosure has the following advantageous effects: for the maritime green human settlement system and the modularized construction method thereof provided by embodiments of the present disclosure, the maritime green human settlement system forms the room and indoor furniture of each storey unit by splicing at least three modules in a dislocation manner, forms at least one recessed portion at the splicing positions, and meanwhile can form multiple indoor-outdoor spatial relationships by providing a deck and solar photovoltaic plates, which enhances the flexibility, shortens construction period and reduces the cost.

DETAILED DESCRIPTION OF EMBODIMENTS

In order to make the objects, technical solutions and advantages of the present disclosure more clear, the present disclosure is described in further detail with reference to the accompanying drawings and the embodiments. It should be understood that the embodiments described herein are only used to explain the present disclosure rather than limiting the same.

Figure 2:
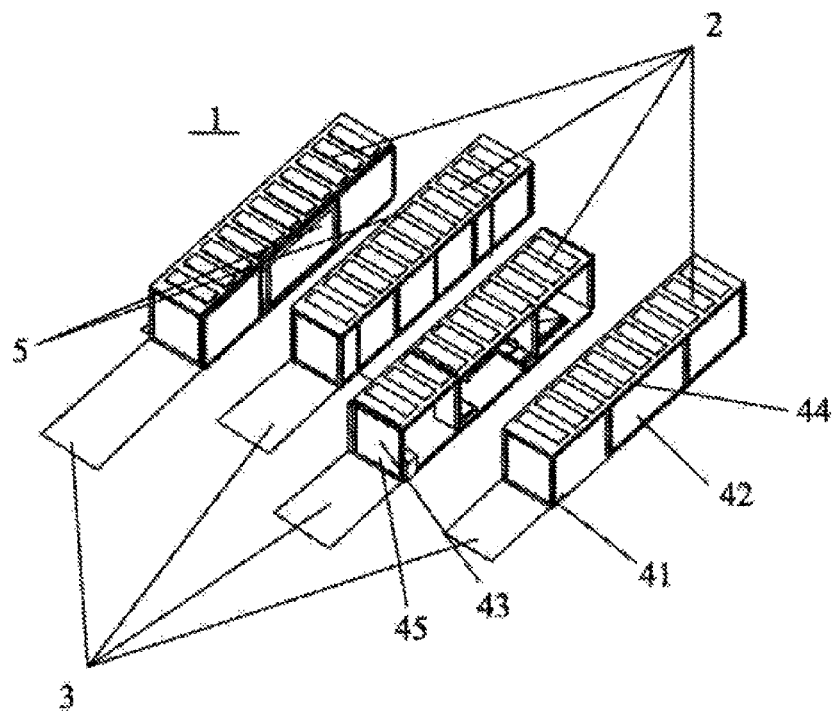
FIG. 2 is a schematic diagram of a first storey unit in an exploded state according to a second embodiment of the present disclosure.

FIG. 2 illustrates a maritime green human settlement system described in an embodiment of the present disclosure. The maritime green human settlement system includes at least one storey unit 1, solar photovoltaic plates 2 and a deck 3. Each of the at least one storey unit 1 is mounted on the deck 3, and the solar photovoltaic plates 2 are mounted on a top surface of the highest storey unit 1, each storey unit 1 includes at least one room and indoor furniture (not shown in figures), the room and the indoor furniture are formed by means of dislocated splicing of at least three modules 4, and at least one recessed portion H is formed at splicing positions.

Figure 3:
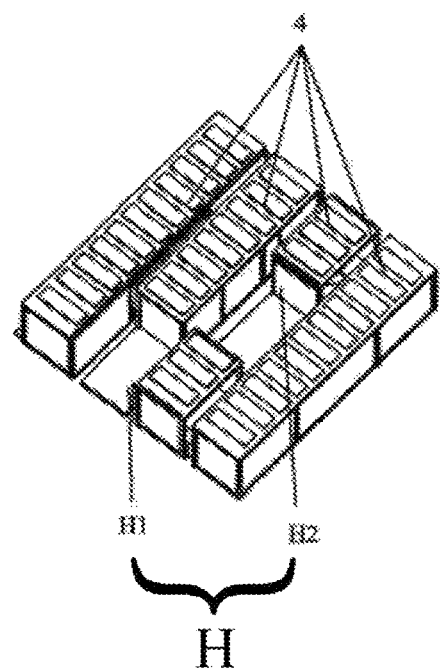
FIG. 3 is a schematic diagram of the mounting of a first storey unit according to a third embodiment of the present disclosure.

Specifically, the rooms are at three in number, including a kitchen, a bathroom and an equipment room each in a different module 4. The width of the deck 3 is the same as the width of the corresponding module 4, and one of the recessed portions H is designed to be an entryway H1. The maritime green human settlement system includes a plurality of storey units 1 and stairs (not shown in figures), each storey unit 1 is provided with a viewing side for sea view and a non-viewing side (as shown in FIG. 3), and the stair is mounted between every two adjacent storey units 1. The modules 4 include a frame 41, an outer wall 42, an inner partition wall 43, a suspended ceiling 44 and a floor 45, the outer wall 42 is made by a heat insulation technology, and the inner partition wall 43 and the suspended ceiling 44 are both made by a light-gauge steel joist system. In this embodiment, as shown in FIG. 3, a part of the suspended ceiling 44 of the module 4 can be removed, so that an indoor ecological garden can be designed for implantation of flowers and plants. The recessed portion H is in number of at least two, and one of the recessed portions is designed to be a gazebo H2 for sea view.

Furthermore, as equipment pipelines are concentrated in the bathroom and the equipment room, the bathroom is arranged to be adjacent to the equipment room so as to avoid wiring disorder. in order to ensure elegant appearance of the whole viewing side of the building, the bathroom, the equipment room and the kitchen are arranged at the non-viewing side of the storey unit 1. The bathroom is designed to be an integrated bathroom, and the individual components of the bathroom are assembled through dry construction, i.e., the components are flexed through bolts and adhesives (not shown in figures) without using sand or cement. The indoor furniture includes fixed furniture for storage use and partition-type furniture (not shown in figures), the fixed furniture is wholly designed according to the building modulus and the furniture modulus, and the basic modulus of the width size of the partition-type furniture is substantially consistent with the basic modulus of a bay of the maritime green human settlement system. In this embodiment, the maritime green human settlement system includes three storey units which have a construction modulus of 300 mm, the furniture modulus is 150 mm in the horizontal direction, 50 mm in the depth direction, and 32 mm in the height direction. Taking the building modulus as the basic modulus, the unit size of the furniture is 300 mm, 600 mm, 900 mm, 1200 mm or 1500 mm. The total width of the partition-type furniture is 2700 mm, 3000 mm, 3300 mm, etc. The basic modulus of the depth modulus of the partition-type furniture is set to be 50 mm, and the expansion modulus is composed of 300 mm, 350 mm, 400 mm, 500 mm, 600 mm, etc.

In order to fully utilize resources, save energy and protect environment, the maritime green human settlement system further includes a seawater desalination system (not shown in figures), a rainwater collecting system (not shown in figures) for recycling rainwater, and a reclaimed water treatment system (not shown in figures) for recycling the domestic wastewater. The rainwater collecting system includes a rainwater filtering device, a water storage device and a purification device. The water storage device is a buried-type water storage module or a water storage tank. The reclaimed water treatment system is combined with a constructed wetland, and includes a grating, a regulating tank, a sedimentation tank, a filtering tank and sterilizing equipment. The working process is performed as following sequence raw water—grating regulation—secondary biological treatment (i.e., constructed wetland)—sedimentation tank—filtering tank—sterilization—reclaimed wastewater, and the resultant reclaimed wastewater can be used for toilet flushing, green d irrigation, etc.

Figure 1:
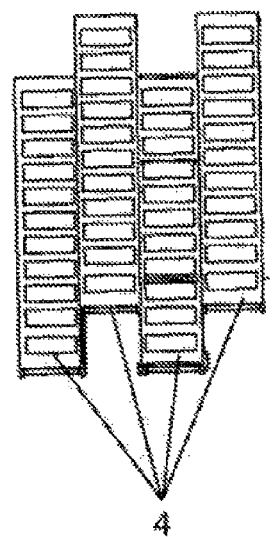
FIG. 1 is a schematic diagram of the mounting of a first storey unit according to a first embodiment of the present disclosure.
Figure 4:
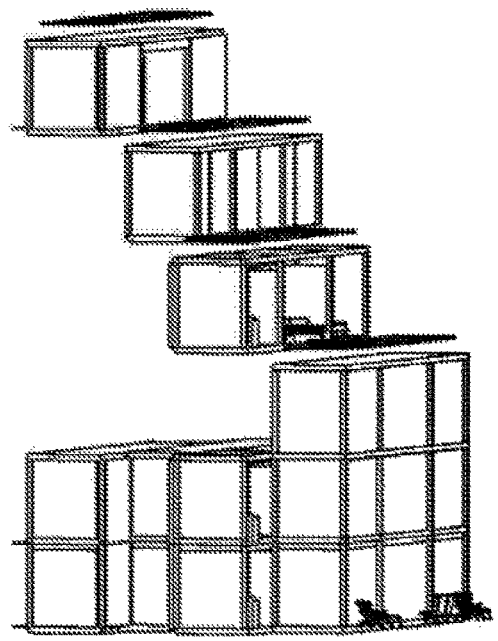
FIG. 4 is a schematic diagram of the mounting of three storey units according to the third embodiment of the present disclosure.
Figure 5:
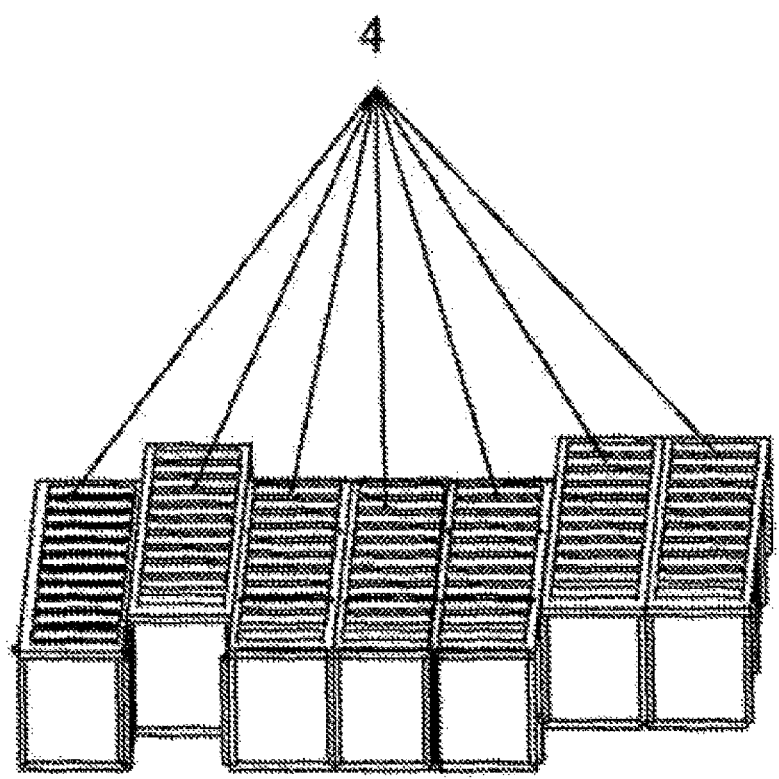
FIG. 5 is a schematic diagram of the mounting of a first storey unit according to a fourth embodiment of the present disclosure.

A preferred embodiment of the present disclosure illustrates a modularized construction method for constructing the maritime green human settlement system. The method includes the steps of:

A. determining, according to the requirements of a customer, the number of floors, the number of modules 4 in each storey unit 1 and an optimal mode of combining the modules 4, and manufacturing individual components of each module and performing preassembling and internal decoration for the modules 4 separately, in a factory prefabricating stage. In this embodiment, the size of each module 4 is for example about 3 m×(8 m-12 m). The maritime green human settlement system is sold in the form of a prefabricated module, the customer can consult the seller before making an order, and customize an unique house scheme. Possibilities are provided for necessary selections in the case where fixed requirements are maintained, so that the customer conveniently and effectively participate in the selection of a building scheme, and finally obtain a satisfactory house. For example, when the size and the overall layout of the house are fixed, the customer can freely select the size, shape, color, etc. of some of the indoor furniture and formulate an appropriate internal decoration scheme according to the preference of the customer;

B. transporting, the individual module 4 to a construction site, and hoisting individual modules 4 of a first s re unit 1 to a designated position before construction operation is started, specifically, in this embodiment, a large truck is adopted to perform a land transportation;

C. assembling the deck 3, and splicing the individual modules 4 of the first storey unit 1 in a dislocation manner on the deck 3 to form an irregular integral structure, during the construction operation, specifically, in this embodiment, the modules 4 are connected through bolts 5, and a gypsum board and sealant (not shown in figures) are used to seal off splicing gaps, after the splicing of the modules 4 is done, as shown in FIG. 1 and FIG. 2;

the method further includes a step between step C and step D:

mounting, in a similar manner to step C, a second storey unit 1 on the top surface of the first storey unit 1, and repeating the mounting until the remaining storey units 1 are all completed, and mounting a stair (not shown in figures) between two adjacent storey units 1, as shown in FIG. 4;

D. mounting solar photovoltaic plates 2 on the top surface of the highest storey unit 1, so as to fully utilize the maritime solar energy resources; and E. performing a dehumidification operation on the maritime green human settlement system.

For the maritime green human settlement system and the modularized construction method thereof provided by the embodiments of the present disclosure, the maritime green human settlement system forms the room and indoor furniture of each storey unit 1 by splicing at least three modules 4 in a dislocation manner, forms at least one recessed portion H at the splicing positions, and meanwhile can form multiple indoor-outdoor spatial relationships by providing a deck 3 and solar photovoltaic plates 2, which enhances the flexibility, shortens construction period and reduce the cost.

The descriptions above are only preferred embodiments of the present disclosure, which are not used to limit the present disclosure. Any modifications, equivalent substitutions, improvements etc. within the spirit and principle of the present disclosure shall all be included in the scope of protection of the present disclosure.

The invention claimed is:

1. A maritime green human settlement system, the system comprising:
    a deck;
    a plurality of storey units, wherein at least one storey unit is mounted on the deck;
    stairs mounted between two adjacent storey units; and
    solar photovoltaic plates mounted on a top surface of a highest one of the storey units,
    wherein each storey unit comprises at least one room comprising indoor furniture, wherein the at least one room comprising the indoor furniture is formed by splicing at least three modules in a dislocation manner, and at least one recessed portion is formed at splicing positions.

2. The maritime green human settlement system of claim 1, wherein one of the at least one recessed portion is designed to be an entryway.

3. The maritime green human settlement system of claim 2, wherein the at least one recessed portion is in a number of at least two, and one of the at least one recessed portion is designed to be a gazebo for sea view.

4. The maritime green human settlement system of claim 1, wherein the room is in number of at least three, and each room comprises a kitchen, a bathroom and an equipment room, with the kitchen, the bathroom and the equipment room respectively located in different modules.

5. The maritime green human settlement system of claim 4, wherein the bathroom is adjacent to the equipment room.

6. The maritime green human settlement system of claim 4, wherein each storey unit is provided with a viewing side for sea view and a non-viewing side, and the bathroom, the equipment room and the kitchen are located at the non-viewing side of the storey unit.

7. The maritime green human settlement system of claim 1, wherein each of the modules comprises a frame, outer walls, inner partition walls, a suspended ceiling and a floor, the outer walls are made by a heat insulation technology, and the inner partition walls and the suspended ceiling are made by a light-gauge steel joist system.

8. The maritime green human settlement system of claim 1, wherein the maritime green human settlement system further comprises a rainwater collecting system for recycling rainwater, and the rainwater collecting system comprises a rainwater filtering device, a water storage device and a purification device.

9. The maritime green human settlement system of claim 1, wherein the maritime green human settlement system further comprises a reclaimed water treatment system for recycling domestic wastewater, the reclaimed water treatment system comprises a grating, a regulating tank, a sedimentation tank, a lifting pump, a hair filter and sterilizing equipment.

10. A modularized construction method for constructing the maritime green human settlement system of claim 1, the method comprising the steps of:
    A. determining, according to requirements of a customer, a number of floors, a number of modules in each storey unit and an optimal mode of combining the modules, and manufacturing individual components of each module and performing preassembling and internal decoration for the modules separately, in a factory prefabricating stage;
    B. transporting the individual components of each module to a construction site, and hoisting individual modules of a first storey unit to a designated position, before construction operation is started;
    C. assembling the deck, and splicing the individual modules of the first storey unit in a dislocation manner on the deck to form an irregular integral structure, during the construction operation; and
    D. mounting solar photovoltaic plates on a top surface of a highest storey unit.

11. The modularized construction method of claim 10, wherein in step C, the modules are connected through bolts, and a gypsum board and sealant are used to seal off splicing gaps, after the splicing of the modules is done.

12. The modularized construction method of claim 10, wherein a further step is comprised between step C and step D of:
    mounting, in a similar manner to step C, a second storey unit on a top surface of the first storey unit, and repeating the mounting until remaining storey units are all mounted; and
    mounting a stair between two adjacent storey units.

13. The modularized construction method of claim 10, further comprising step E of:

performing a dehumidification operation on the maritime green human settlement system.

* * * * *